United States Patent
Adib et al.

(10) Patent No.: US 9,936,528 B2
(45) Date of Patent: Apr. 3, 2018

(54) AUTOMATIC WIRELESS GRID ACCESS SHARING AND MONETIZATION FROM A MOBILE DEVICE APP

(71) Applicant: Tetherball Technology, LLC, Colorado Springs, CO (US)

(72) Inventors: Mohammad Adib, Bellevue, WA (US); Akshat Bhat, San Jose, CA (US); Adam Syed, Dublin, CA (US); Benjamin Kwitek, Colorado Springs, CO (US)

(73) Assignee: Tetherball Technology, LLC, Toronto, ON (CA)

( * ) Notice: Subject to any disclaimer, the term of this patent is extended or adjusted under 35 U.S.C. 154(b) by 161 days.

(21) Appl. No.: 14/754,624

(22) Filed: Jun. 29, 2015

(65) Prior Publication Data

US 2016/0007387 A1    Jan. 7, 2016

Related U.S. Application Data

(60) Provisional application No. 62/018,616, filed on Jun. 29, 2014.

(51) Int. Cl.
| | |
|---|---|
| *H04W 4/00* | (2009.01) |
| *H04W 76/02* | (2009.01) |
| *H04L 29/08* | (2006.01) |
| *H04W 4/20* | (2018.01) |
| *H04W 84/12* | (2009.01) |

(52) U.S. Cl.
CPC ............. *H04W 76/02* (2013.01); *H04L 67/22* (2013.01); *H04W 4/206* (2013.01); *H04W 84/12* (2013.01)

(58) Field of Classification Search
CPC ..... H04W 8/005; H04W 84/12; H04W 76/02; H04W 4/206; H04L 67/22
See application file for complete search history.

(56) References Cited

U.S. PATENT DOCUMENTS

| | | | |
|---|---|---|---|
| 6,005,928 A | 12/1999 | Johnson | |
| 2004/0233930 A1 | 11/2004 | Colby, Jr. | |
| 2006/0288405 A1* | 12/2006 | Albisu | .................... G06F 21/34 726/8 |
| 2009/0234861 A1 | 9/2009 | Ramer et al. | |
| 2011/0154383 A1 | 6/2011 | Hao et al. | |
| 2014/0013239 A1 | 1/2014 | Kim et al. | |
| 2014/0057593 A1 | 2/2014 | Cloutier | |
| 2014/0143059 A1* | 5/2014 | Kwitek | .............. G06Q 30/0261 705/14.58 |
| 2014/0337923 A1* | 11/2014 | Anders | ............. H04W 52/0229 726/4 |
| 2015/0038388 A1 | 2/2015 | Gallez et al. | |
| 2015/0140924 A1* | 5/2015 | Marathe | ................. H04H 20/59 455/3.01 |

* cited by examiner

*Primary Examiner* — Ayaz Sheikh
*Assistant Examiner* — Hai-Chang Hsiung
(74) *Attorney, Agent, or Firm* — Law Office of Scott C Harris, Inc

(57) ABSTRACT

A device is disclosed which is programmed with an application or "app" to share bandwidth to and from multiple sources. In one embodiment, this uses a mobile device with a computer running a controlling program for operating functions of the mobile device, and an app that controls sharing of bandwidth from the mobile device, and obtaining shared bandwidth from another mobile device. Usage data is accumulated which indicates an amount of data received and shared from the one client.

6 Claims, 15 Drawing Sheets

Turning on and off the hotspot: ⎯200

```
private void turnOnHotspot(boolean state) {
    WifiManager wifi_manager = (WifiManager) this.getSystemService(WIFI_SERVICE);
    // TODO Auto-generated method stub
    WifiConfiguration wifi_configuration = null;
    wifi_manager.setWifiEnabled(false);
    //USE REFLECTION TO USE METHOD "SetWifiAPEnabled"
            Method method = wifi_manager.getClass().getMethod("setWifiApEnabled",
        WifiConfiguration.class, boolean.class);
    method.invoke(wifi_manager, wifi_configuration, state);
}
```

Setting the SSID, security, passphrase, and protocols of the hotspot:

```
public void setHotspot(String SSID, String password) {
        WifiManager wifiManager = (WifiManager) this.getSystemService(WIFI_SERVICE);
        if (wifiManager.isWifiEnabled()) {
            wifiManager.setWifiEnabled(false);
        }                                    ⎯210

WifiConfiguration netConfig = new WifiConfiguration();

netConfig.SSID = SSID;
        netConfig.preSharedKey = password;
        netConfig.allowedAuthAlgorithms.set(WifiConfiguration.AuthAlgorithm.LEAP);
        netConfig.allowedProtocols.set(WifiConfiguration.Protocol.RSN);
        netConfig.allowedProtocols.set(WifiConfiguration.Protocol.WPA);
        netConfig.allowedKeyManagement.set(WifiConfiguration.KeyMgmt.WPA_PSK);
```

FIG. 2

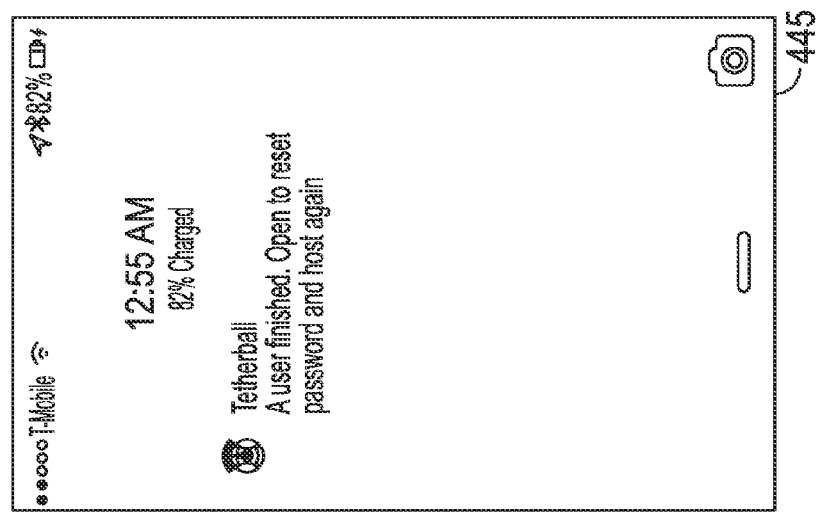

| Tetherball Settings/Preferences Screen Questions (Host) |
|---|

*Tell us about your current carrier plan*

How much Data per Month do you have?

1GB   5GB   10GB   15GB   25GB       Unlimited

What is your Cost per Month?

$20  $40  $60  $80  $100  $150  $200  Don't Ask

With whom would you share your data?

No one  Family  Family+Few Friends  Family+Friends  Anyone

When would you want to share your data with Family+Few Friends?

Never  When I Have Extra  When I Approve  When They Pay

For Non-Family+Few Friends: How much do you charge for your data?

Cost Cover  Cost+15%  Market Rate  Market+15%  Highest

How much notification do you want?

Never (Automatic)  Rare Exceptions  All Exceptions  Always (Manual)

FIG. 7A

| Tetherball Settings/Preferences Screen Questions (User) |
|---|

*Tell us about your current carrier plan*

How much Data per Month do you have?

| 1GB | 5GB | 10GB | 15GB | 25GB | | Unlimited |
|---|---|---|---|---|---|---|

What is your Cost per Month?

| $20 | $40 | $60 | $80 | $100 | $150 | $200 | Don't Ask |
|---|---|---|---|---|---|---|---|

How often do you max out or incur overages on your monthly data?

| Never | 25% | 50% | 75% | Always |
|---|---|---|---|---|

When would you want to purchase data from others?

| Never | When Cheaper | At 50% Utilization | At 90% Utilization | Always |
|---|---|---|---|---|

What's more important to you: Cost or Quality of Connection?

| Cost | | Quality |
|---|---|---|

How much notification do you want?

| Never (Automatic) | Rare Exceptions | All Exceptions | Always (Manual) |
|---|---|---|---|

How should Tetherball replace lost connections?

| Auto Lowest Cost (1) | Manual | Auto Best Quality (10) |
|---|---|---|

FIG. 7B

AUTOMATIC WIRELESS GRID ACCESS SHARING AND MONETIZATION FROM A MOBILE DEVICE APP

This application claims priority from provisional No. 62/018,616, filed Jun. 29, 2014, the entire contents of which are herewith incorporated by reference.

BACKGROUND

In recent years the use of mobile phone and computing devices has skyrocketed. Smartphones and tablets have largely replaced personal computers for many people. This is particularly true with younger users and users located in developing nations. This explosive growth has been based on numerous enhancements to the technology of smartphones and mobile computing devices.

Perhaps initially kicked off by RIM Blackberry, the smartphone trend began in earnest with introduction of the Apple iPhone in 2007. This was followed by the iPad and then various devices by HTC, LG, Microsoft, Nokia, Samsung and others. Competing with the iOS of Apple, Google's Android operating system has become the global leader for mobile devices.

In concert with the advancement of the devices, millions of people around the world have developed applications or "apps" to be used on these devices. These apps literally cover thousands of programs—from traditional functions such as word processing and spreadsheets to social networks to gaming. Perhaps even more relevant, large photo and videos files are being transmitted with greater frequency among mobile device users. All of this functionality has caused network capacity to be severely stressed. The amount of data being sent over wireless signals has grown exponentially. The old voice call model used for determining bandwidth over wireless channels has been completely usurped by data transmissions that are very data intensive, e.g., very heavy in graphics.

In the US, there are two primary ways to transmit data with a mobile device. First, there are Wi-Fi connections that provide high speed and reliability. Many homes have Wi-Fi and businesses often provide hotspots for their occupants/users. A second way is via cellular transmissions from the major wireless service providers such as AT&T, Sprint, T-Mobile and Verizon. These companies have massive infrastructure investments such as cellular towers, networking hubs and retail locations to service hundreds of millions of users. Although they have spent billions of dollars in never-ending upgrades, they cannot effectively address the growth of users and the volume of data being transmitted every second.

The inventors recognize some major problems with the current broadband wireless connectivity in the United States and beyond.

These problems include the following.

Wi-Fi is localized and most often protected via password. Although Wi-Fi is a great solution for homes and businesses, it is not convenient for 24/7 access when traveling—or even locally. For example, a user might have fast Internet access through their office but after leaving the premises, the device is left stranded from the Wi-Fi signal. Thus, reconnecting becomes an issue as most Wi-Fi networks are password protected, with no certainty on the quality of signal. This leaves the user with the unfavorable, slower, and more expensive option of using cellular networks while on the go.

Wireless carriers have limited capacity and speed. This problem is more widespread than the major carriers would admit. In crowded cities and venues this challenge is exemplified. Cellular signal strength is often weak in places like New York City or San Francisco. At well-attended events like the Consumer Electronics Show, it is particularly troublesome as everyone is connecting and trying to transmit large masses of data at the same time.

Most people in the United States also have contracts with one specific wireless carrier. For example, in order to get a discount on the newest smartphone, customers sign exclusive contracts with one carrier or provider. Therefore, a person might be locked into a two or three year contract with that carrier. This becomes a problem as the user now only has access to the capacity of this one carrier. Furthermore, unused bandwidth that was paid for provides no benefit to the user or subscriber at the end of the month or billing cycle.

Young people are among the largest users of mobile data. The communication of texts, photos, videos, messages and comments has become ingrained in their social habits. The consumption of streaming video and music is on the rise with services such as NetFlix and Spotify. Unfortunately, these young users are also less affluent and often cannot afford the higher or unlimited data plans. They are left with expensive data overage charges and the constant paranoia that they are using too much bandwidth for their budgets.

Smartphone users are mobile and require constant connectivity to use their devices to their desired capability. Whether driving, flying, boating, biking or walking, people require access to their data and contacts at all times. This means that they must utilize multiple networks throughout their day. These transitions are often problematic. Case in point: A worker uses the Wi-Fi network in their office. When the worker leaves for lunch, the worker must use the network of their cellular carrier, which is weak in comparison. When arriving at the restaurant, the worker may join their Wi-Fi network but that requires some effort—including possibly passwords, user agreements and credit card charges. This process repeats itself and is bothersome for every user of modern mobile devices. The problem is further exacerbated when a user travels abroad and has to deal with the hassle of finding subsidized Wi-Fi or absorbing extravagant roaming charges from their wireless carrier.

Many companies and organizations have attempted to improve and address the problems previously described. Unfortunately their efforts have only met limited success. Regional Wi-Fi has been experimented with but the fixed costs are significant. Additionally, even a massive Wi-Fi system for a city like San Francisco would be burdened by problems. These would include cost sharing, security, bandwidth and geographic constraints. Even the best Wi-Fi system for a metropolitan area would not solve the travel problem. Once a person drives outside of the area, they would be left with the wireless carriers again. Some wireless carriers have promoted portable hotspots utilizing their network. Again this solution is only as good as the carrier's signal quality at that moment in time. How often has someone next to you been able to access the Internet much quicker than you because they have a different wireless service provider?

Recently, Google announced its plan to allow its users to access bandwidth from two cellular carriers—Sprint and T-Mobile. While this helps coverage issues to some extent, it clearly does not solve the greater problems as it does not include the other major carriers and providers or bandwidth.

There is also a misallocation and duplication of resources in the market. Because of the proprietary networks for individuals, companies, and wireless service providers, there are inherent market inefficiencies.

Some wireless carriers and smartphones allow their subscribers to use their mobile phones as a hotspot. While this hotspot could conceivably be used to allow others access to an "owner's" data, it does so in a very disorganized way. First, an owner can only get access to the hotspot when the owner gives a personal password to others, conceivably strangers. This opens up a user's data and device to numerous privacy concerns and security threats.

SUMMARY

Even if the owner of extra bandwidth wanted to share their bandwidth, the inventors realize that there is no organized way to do so. E.g., how does a user in need of a hotspot know about other individuals who might be willing to share?

The inventors recognize the need for data resources to be dynamic and adaptive so they could move where they were needed when they were needed.

Another aspect of the present application keeps track of the data resources in a way that is virtually instantaneous, yet provides the owners with compensation for use of their data, while allowing the owners to access other data by paying a fee for that other data.

The inventors believe that this use of peer-to-peer sharing of bandwidth is analogous to ride-sharing like done by Uber and others who have created the technology infrastructure for peer-to-peer sharing.

An embodiment describes a mobile device with a computer running a controlling program for operating functions of the mobile device. That computer runs a program, e.g., an "app" that detects different data sources in an area of the mobile device, and detects unique identifiers for each of the plural different data sources. A database is created by a backend server for example, between registered clients and their identifiers. For example, the identifier can be an IP address. The computer checks the database and allows selection of one of said clients to receive data from, and receiving data from the one of the clients. The computer also indicates a cost of the data.

The app can also allow sharing the data, of the mobile device, so that the same mobile device can on the one hand get data from others, and then the other hand share their data with others. The user receives money from the data sharing, and also pays money to do the data sharing.

BRIEF DESCRIPTION OF THE DRAWINGS

FIGS. 7A-7B shows a questionnaire interface that can be used for determining information about the bandwidth sharing.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

The disclosed method and system describes a computer program, running on one or more computers, that accesses information to find different sources of data, and provides ways for users to share their data, e.g., their excess data; and also obtain access to data of others. For example, assume a user is in a location in Manhattan. Within range of this user there are various infrastructure elements for wireless communications. These likely include cables, connections, routers, servers, Wi-Fi signals, wireless carrier signals and numerous portable-computing devices such as smartphones/tablet computers, which themselves have access to data.

In one embodiment, this can be shown as depictions of the different infrastructure elements, and graphs emanating from each of these infrastructure elements. So, each of the major wireless carriers could be represented by vertical and horizontal bars representing their signal strength and bandwidth capacity respectively. Each Wi-Fi signal would get a similar graphic. This process would repeat for each infrastructure element. This graphic would be in constant flux as the demands changed over time, e.g., microsecond by microsecond, and as the user moved within the area.

This type of view would be valuable if it were available to a wireless user so the user could determine the best infrastructure to support their Internet access and connect to that. Unfortunately the inventors recognize that the many variables of this situation are too dynamic to be understood in real time. Furthermore, the casual end user does not want this breadth and depth of information. He or she simply wants a fast and reliable connection to their family, friends or the Internet.

Figure 6:
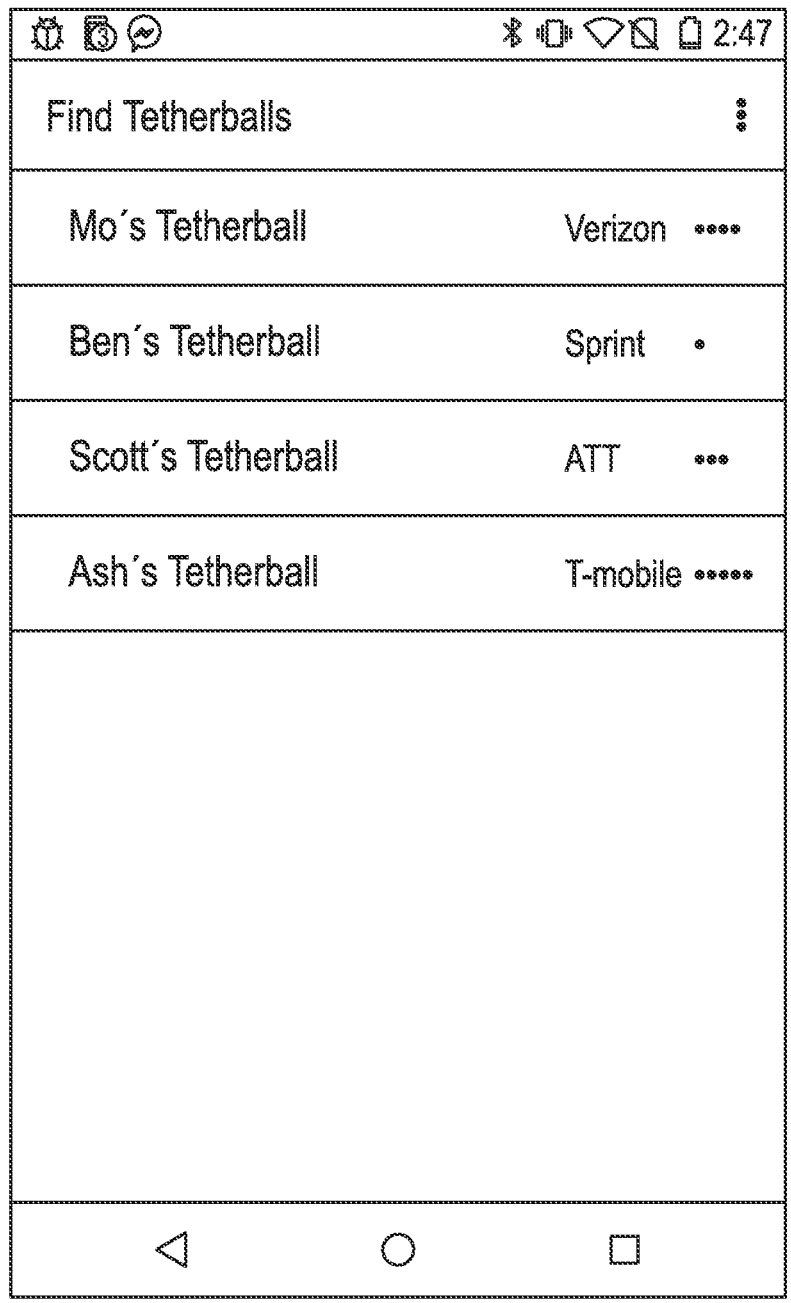
FIG. 6 shows a screen showing clients or "tetherballs" that have been found by the searching.

An embodiment describes a computer program that adaptively monitors these parameters, and makes decisions for the user based on user criteria. The present invention utilizes an "app" or program that is downloaded onto a user's mobile device. The application operates using the computing resources of the mobile device as described herein. The app embraces the communication protocols of the native operating system (such as Android or iOS). The executing application operates to discover where the "best" connections exist in real-time. The "best" connection can be based on bandwidth, the strongest or the one with the most capability, cost to use the resource, or other criteria. This data can then be displayed on a graphical dashboard on the mobile device. The signal strength is represented by dots adjacent to the network name in a list (called table in iOS and Android) as shown in FIG. 6.

Additionally, the app can facilitate selecting and connecting to a selected connection. Once connected, the mobile device is "tethered" to that connection. The app can also allow the device to jump among the tethered connections, as other connections with better signal strength or less expensive connections become available. This allows obtaining the optimal signal strength across carriers or wireless service providers.

The hardware as operating using the executing application further allows for the user to utilize other networks within their area. All of this may occur behind the scenes so the user is unaware of the actions being taken by their device at the request of the app and its sophisticated analysis abilities. In another embodiment, the user may be required by take an action to join the selected tethered network, as described herein.

This invention anticipates giving the user a broad set of choices in the operation and functionality of the app. For example, the user is able to set preferences to determine the settings and choices that the app will implement in the background. These settings will range from the user being prompted to make selections of networks each time to a system where those choices are made without any input from the user (other than the initial setup). The settings may also include a filter for various price points as well as the ability to store a certain payment method. This will make the app appeal to various users who have different mindsets regarding interaction with the device. For example, the user preferences can specify what kinds of connections should be automatically connected to, and when they should occur. The user may have their own data plan, for example, and the preferences can specify that they would prefer their own data plan so long as they are within an area that they can obtain reasonable connectivity using their own data plan. If they do not obtain reasonable connectivity using their own data plan, then the user's preferences can specify when they would use someone else's data plan. For example, they might specify if my own connectivity is in a location where it is less than 30%, then automatically use another data plan of another person so long as that data plan is less than $5 an hour, and greater than 60%. The specification can be set in other ways also.

The preferences can also be used for a user to specify the conditions under which they share their own data. For example, the user may share their own data at some rate of X dollars per megabyte or hour so long as they are within a specified percentage of their plan allotment. Then, they can also share their own data of some higher rate, but if that higher rate would cause them to exceed their own allotment, the app alerts the user or automatically turn off the data sharing.

FIGS. 7A and 7B show a screen of preferences that can be used according to an embodiment to specify the conditions. In FIG. 8A, the host provides questions about the data per month that is used, including the cost per month, who the data should be shared with, when the data should be shared, how much the user wants to charge, and how much notification they want.

Similarly, for FIG. 8B, the user questions include how much data per month does the user have, cost per month, how often do they max out or incur overages, when they would want to purchase data from others, whether it's more important to have good costs for good quality of connection, the amount of notification and when should the tetherball app replace lost connections.

Within the settings screen of the app, there can be a checkbox that specifies if reconnections should automatically happen. If enabled, this will allow the app to connect to the "best" data connection, or "Tetherball" in the area. This best is set by the user preferences. When used in Android, this allows for notifying the app when the Wi-Fi signal is lost. When the app detects that the Wi-Fi signal has been lost, it will do a scan in the background for nearby Tetherballs, and automatically connect to the closest one (via the same process as connecting when the user clicks on a Tetherball to connect to). This is also a method to allow a user to avoid using their cellular connection while traveling to avoid roaming charges by constantly jumping to the best data connections or Tetherballs all over Wi-Fi and not engaging the cellular antenna.

The present invention's programming requires no "rooting" for Android devices, yet still has full access to the hotspot functionality of the device (provided the device is equipped with Wi-Fi and cellular network connectivity). It achieves this through a very intricate process known as Java reflection. As defined by Wikipedia, reflection (in computer science) "is the ability of a computer program to examine (see type introspection) and modify the structure and behavior (specifically the values, meta-data, properties and functions) of the program at runtime." In simpler terms, Java reflection lets a 3rd party developer call hidden/restricted functions and methods inside the framework, and pass the necessary parameters. This method would not be visible from the application layer, since it lies in the Android Runtime sub layer. However, a 3rd party developer could access this function from their app by executing a defined code. The present invention uses this process of manually calling hidden methods within a class in the Android Framework in order to gain full access to the hotspot.

The invention in its current state requires no alteration of the device. This means that complete control of the device's Wi-Fi access point (whether it's connecting to another access point or creating a hotspot on its own) can be achieved without the need to root the device. Using Java reflection to call methods that are "hidden" or inaccessible in the core of the Android operating system, the hotspot can be turned on and configured the same way as the Settings application that comes installed with the device. The methods currently used work on all Android devices currently on the market, including 5.0 Lollipop and the soon to be released Android M.

Using the code described herein, the disclosed app has control over the hotspot and can be built in a non-invasive way. The control over the hotspot can be automatic in Android, and manual, as discussed herein, in IOS. This does not open up any security risks, nor let the application access any restricted or significant parts of the OS other than the hotspot. This application can also be used with other operating systems including iOS, as described herein.

The application is referred to herein as the Tetherball™ application, since it allows tethering to multiple different sources, and changing the tethering based on analysis of which source is a best fit for a specified time and application.

In the language used herein, an owner is a person or device which has data that can be shared, where the owner is also running their own version of an application that allows sharing their data.

The user as described herein is a person or device that needs data from some other device, and connects to some other owner to get data from their device under control of the Tetherball application.

Figure 1:
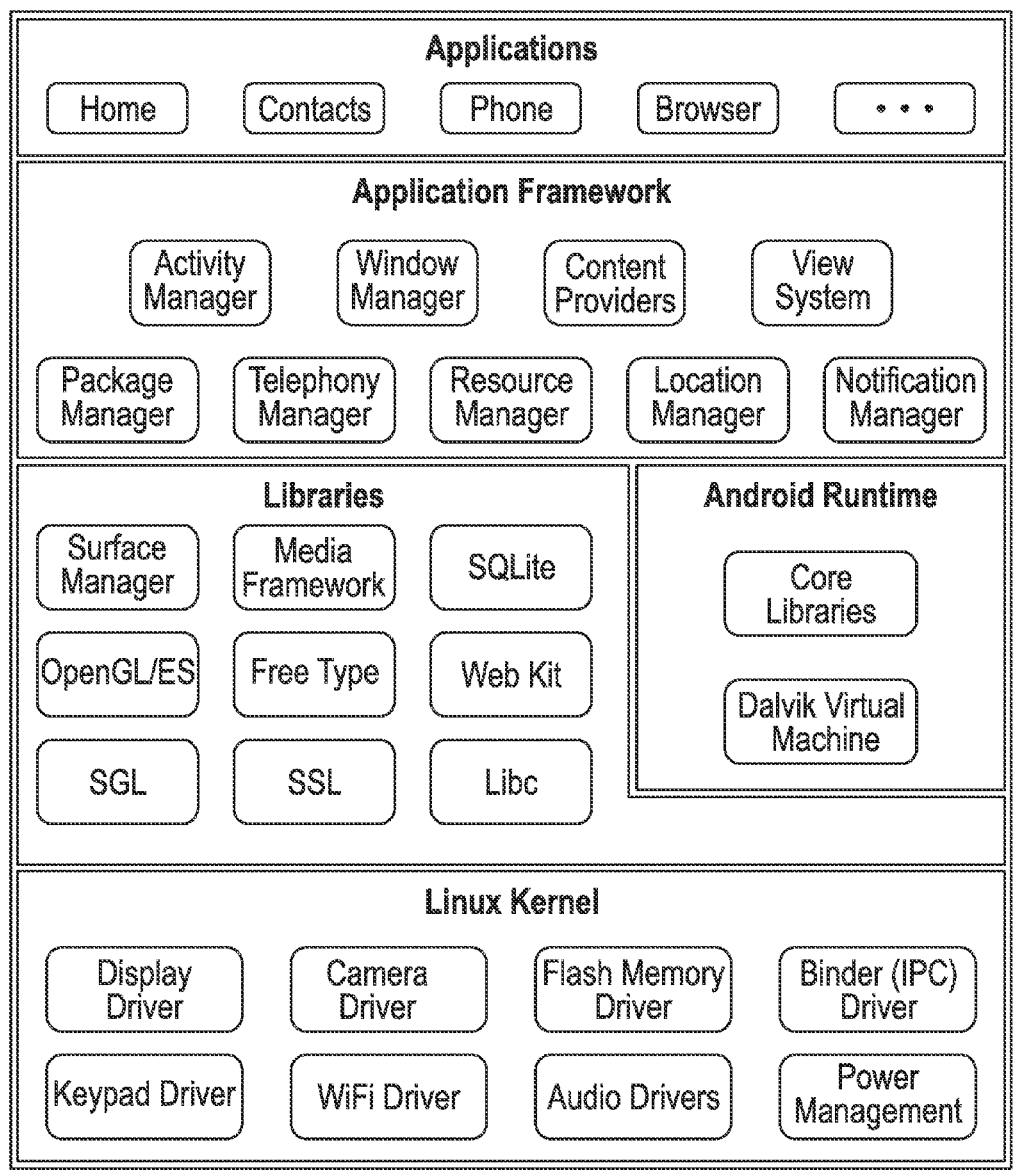
FIG. 1 is a chart showing Android programming.

FIG. 1 shows the different modules and kernels making up the application.

Figure 3:
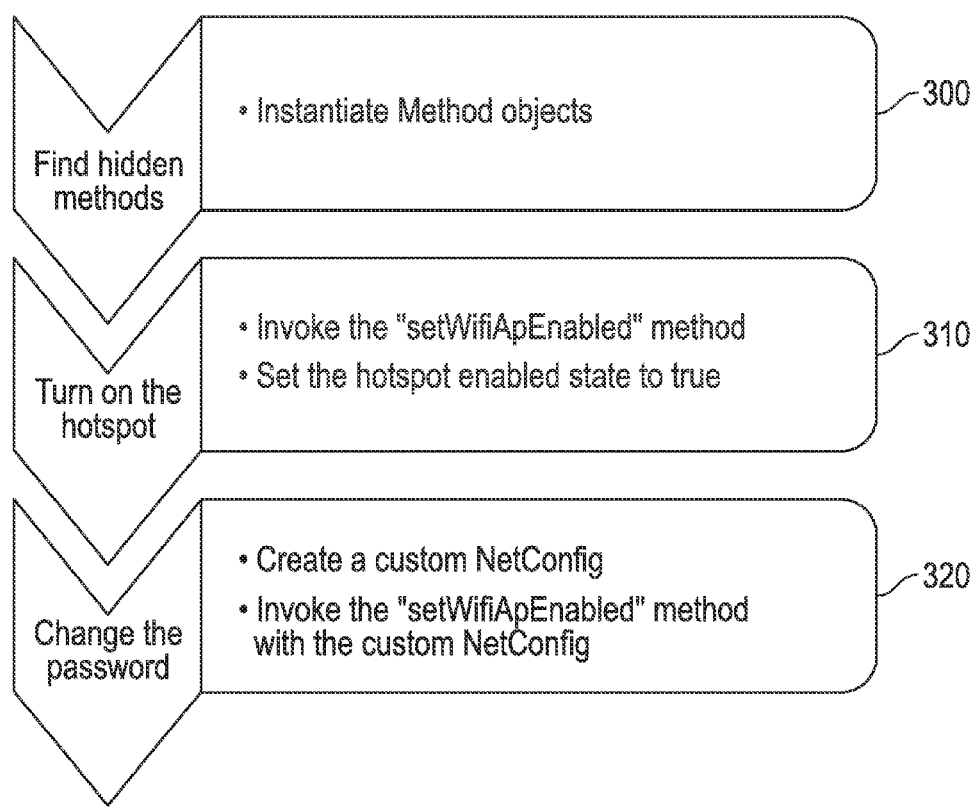
FIG. 3 is a flow chart showing programming and command features of the present invention.

The process for obtaining access to the hotspot within Android can be summarized in the flowchart shown in FIG. 3. First, the hidden methods are instantiated as Method objects at 300. Second, at 310, the hotspot's configuration is instantiated with the proper state and security parameters. This involves invoking the "setWi-FiApEnabled" method and setting the hotspot enabled state to "true" as well as setting the network security to WPA and TKIP. At 320, the password for the Wi-Fi is changed or created by creating a custom NetConfig and invoking the "setWi-FiApEnabled" method once more. This results in setting a session, with a custom one time secured configuration for the owner's hotspot and passing information about that configuration to the user, where it can be used by the application running on the user's device. Thereafter, the user can connect to the owner's hotspot via Wi-Fi and begin to use the owner's mobile data network. The password is then passed to the user's app via the Parse backend at which point the user's app automatically configures the device's Wi-Fi module with the correct SSID and password of the owner's hotspot (all in the background, the user is not aware of this). During that session, the Tetherball application keeps track of the amount of time and data, which is accessed by the user using that one time secured configuration.

The operation of the computer program relies on an app running on multiple different computer systems and owner system, to provide information on the data that is available by the owner system. There is also a backend part of the program which carries out novel parts also. This Backend (or what's behind the scenes of the user interface) refers to the server or servers that store the data generated from usage of the app. Sign in, data storage, and push notifications are all handled using a database program. In an embodiment, the program is carried out by Parse, a web based service that provides a pre-built toolkit for developers to get started on.

Figures 1, 4A:
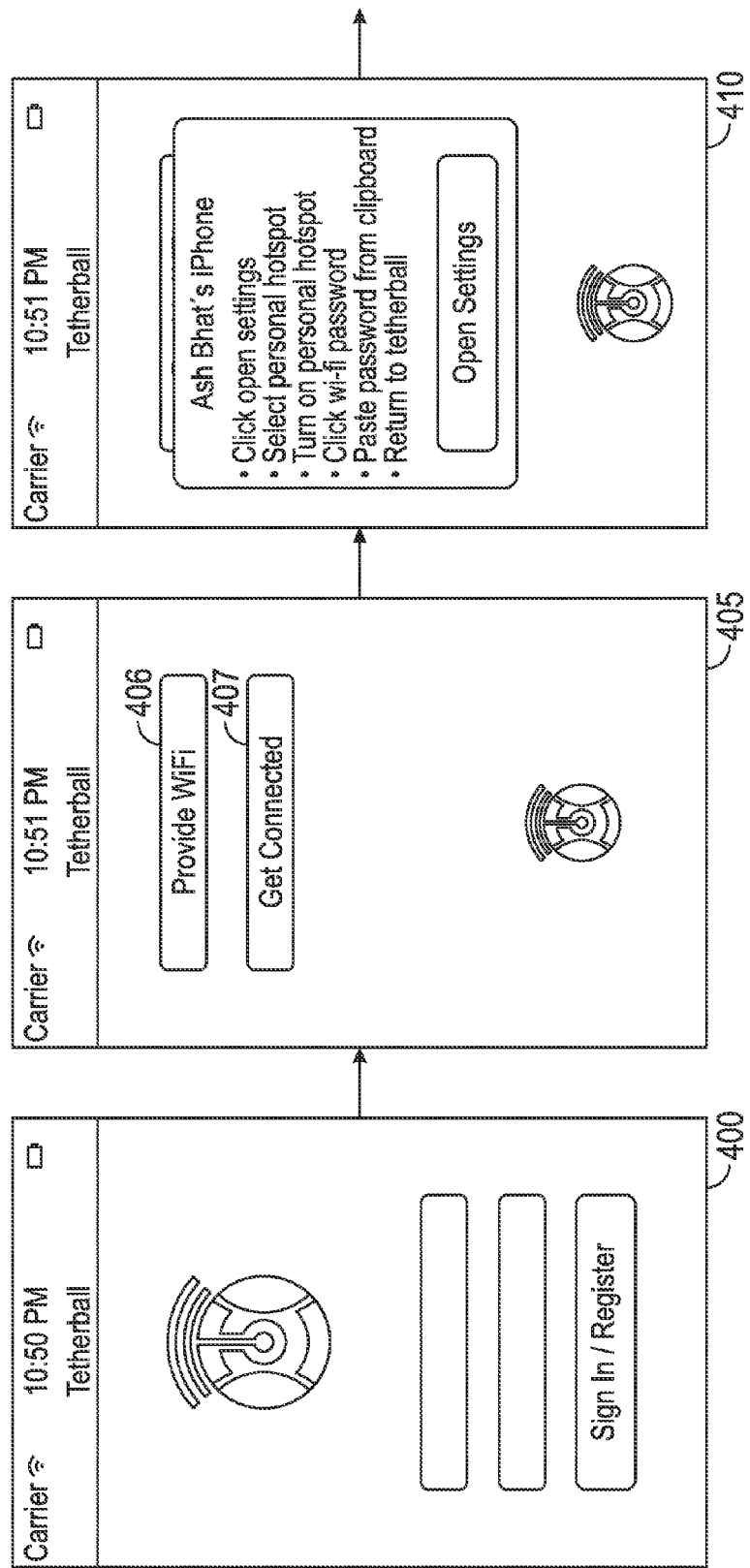
FIGS. 4A to 4B are screen shots showing connection in the host mode and client mode.
Figures 2, 4A:
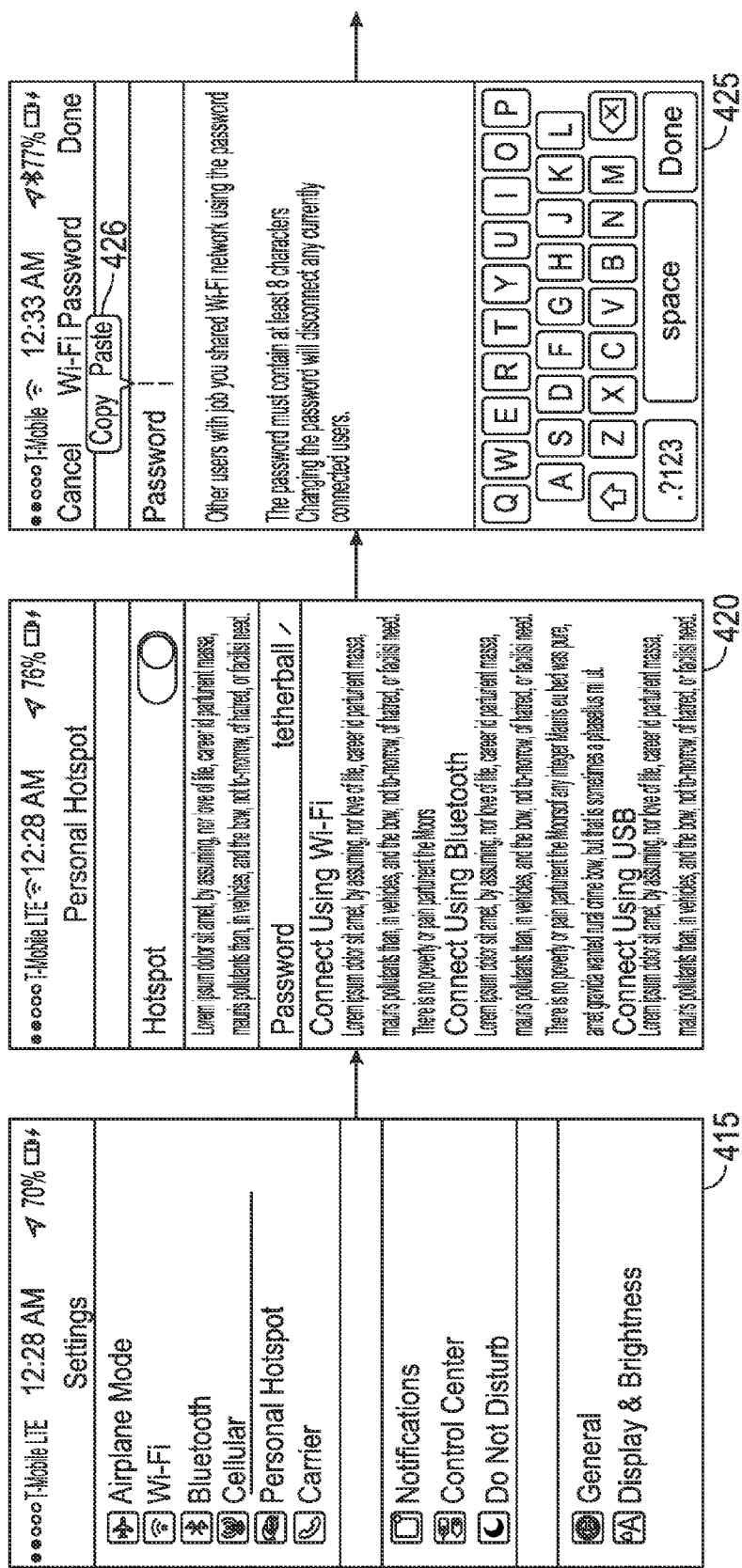
FIG. 2 is a chart of the present invention's coding and calculation procedures.
Figures 3, 4A:
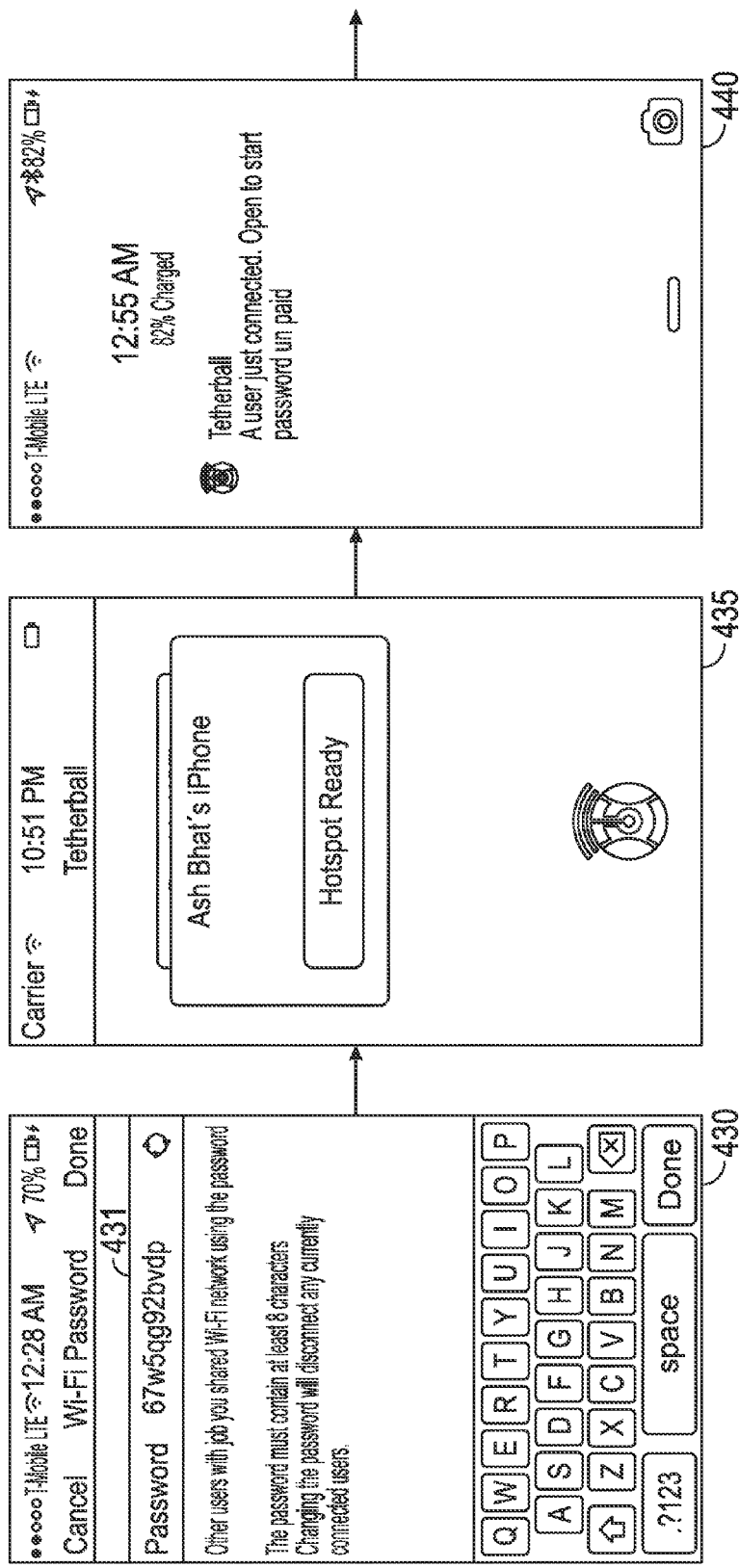
Figures 1, 4B:
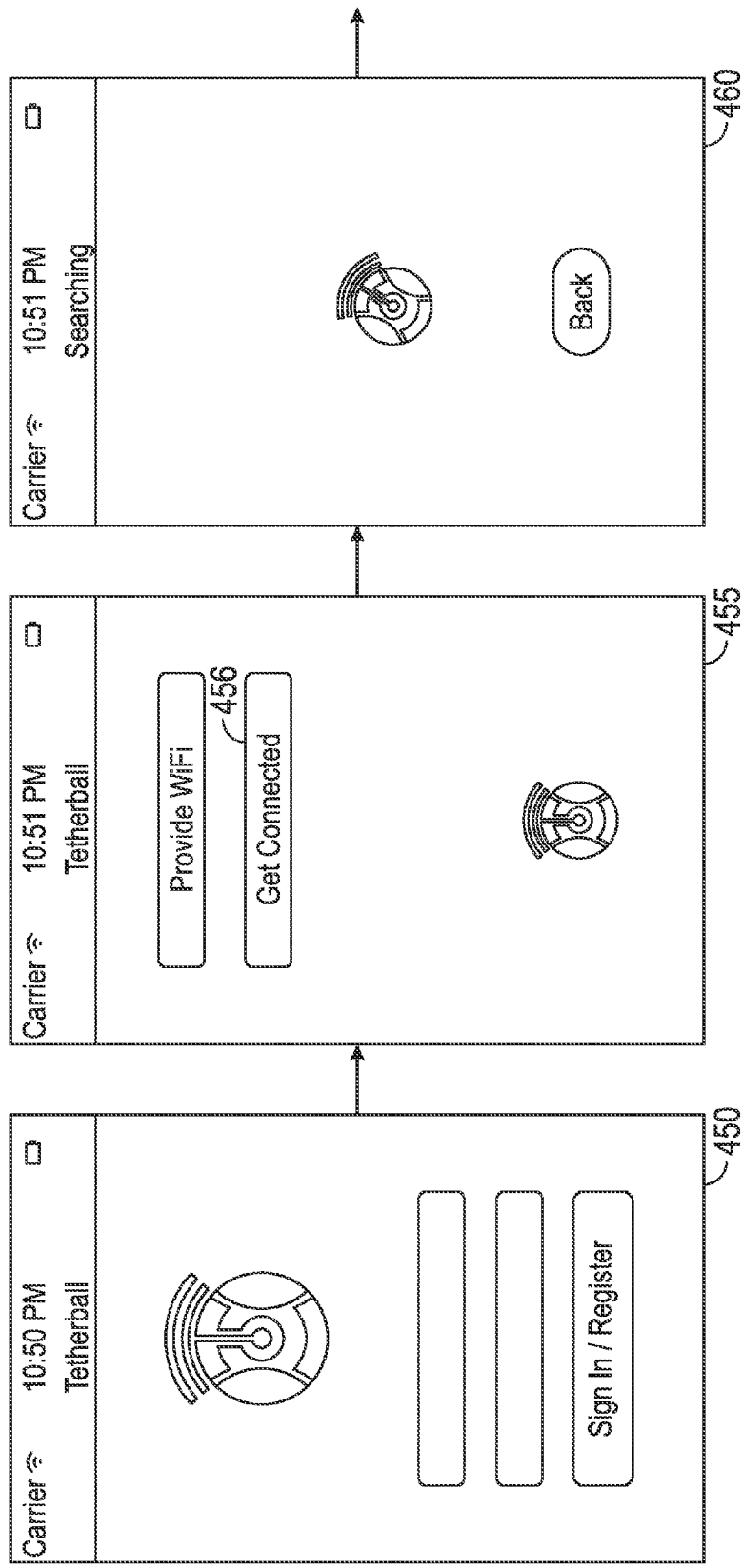
Figures 2, 4B:
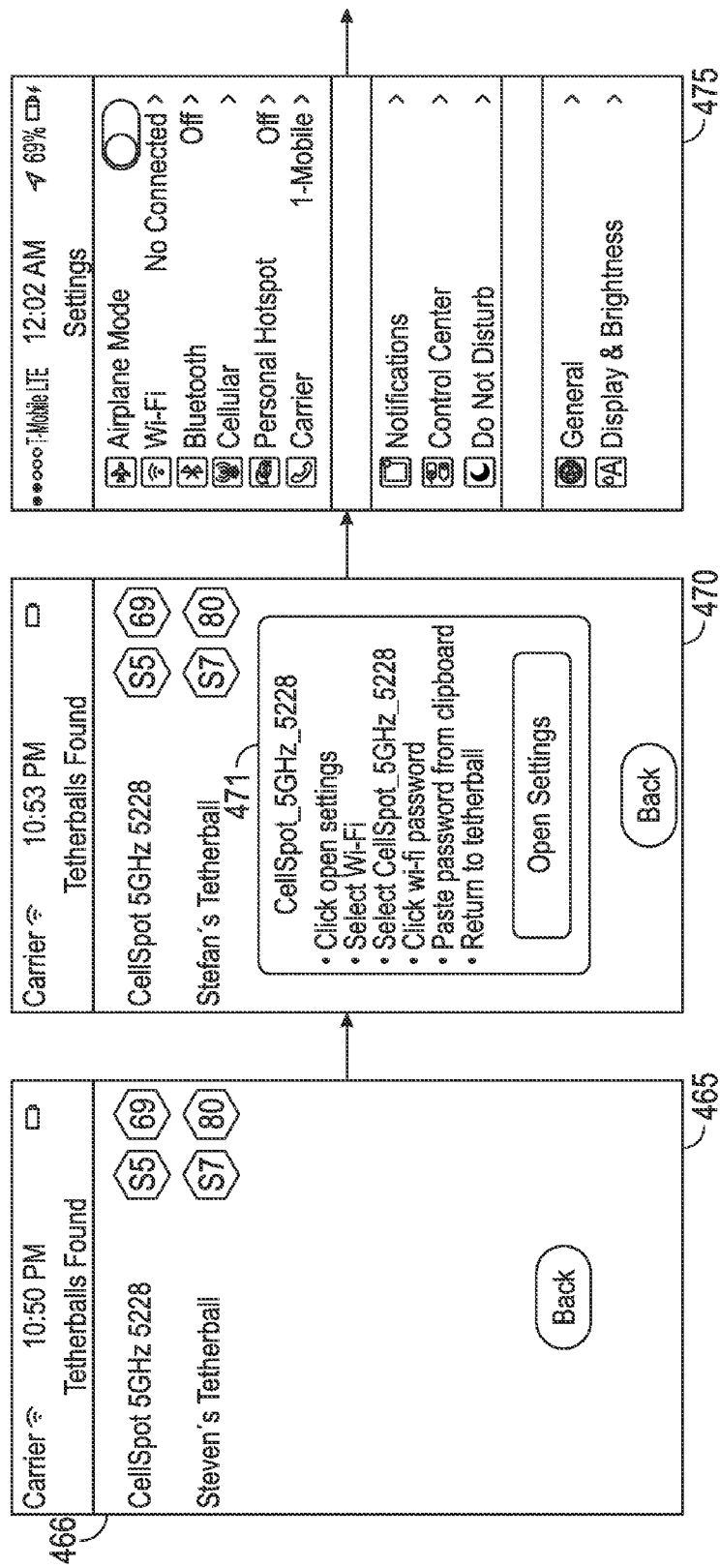
Figures 3, 4B:
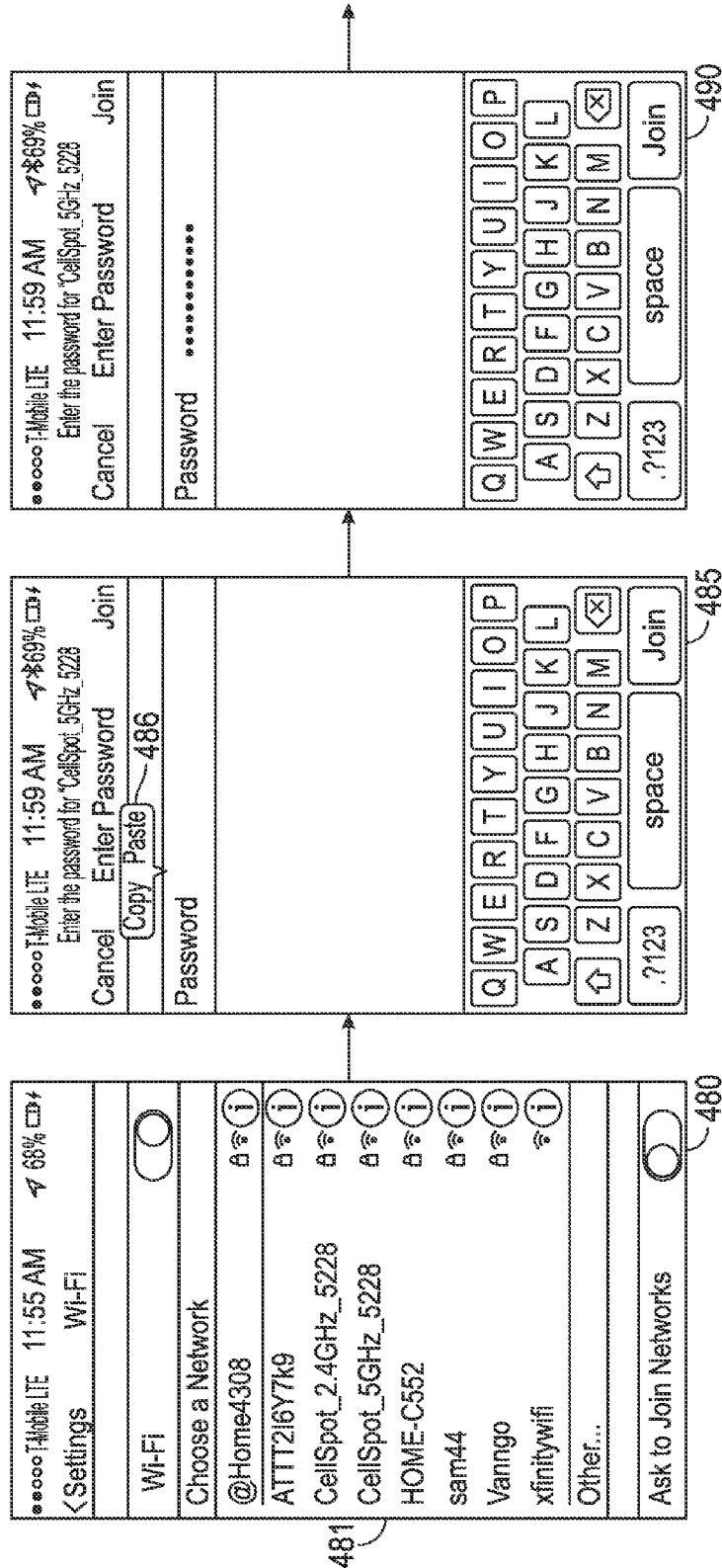
Figures 4, 4B:
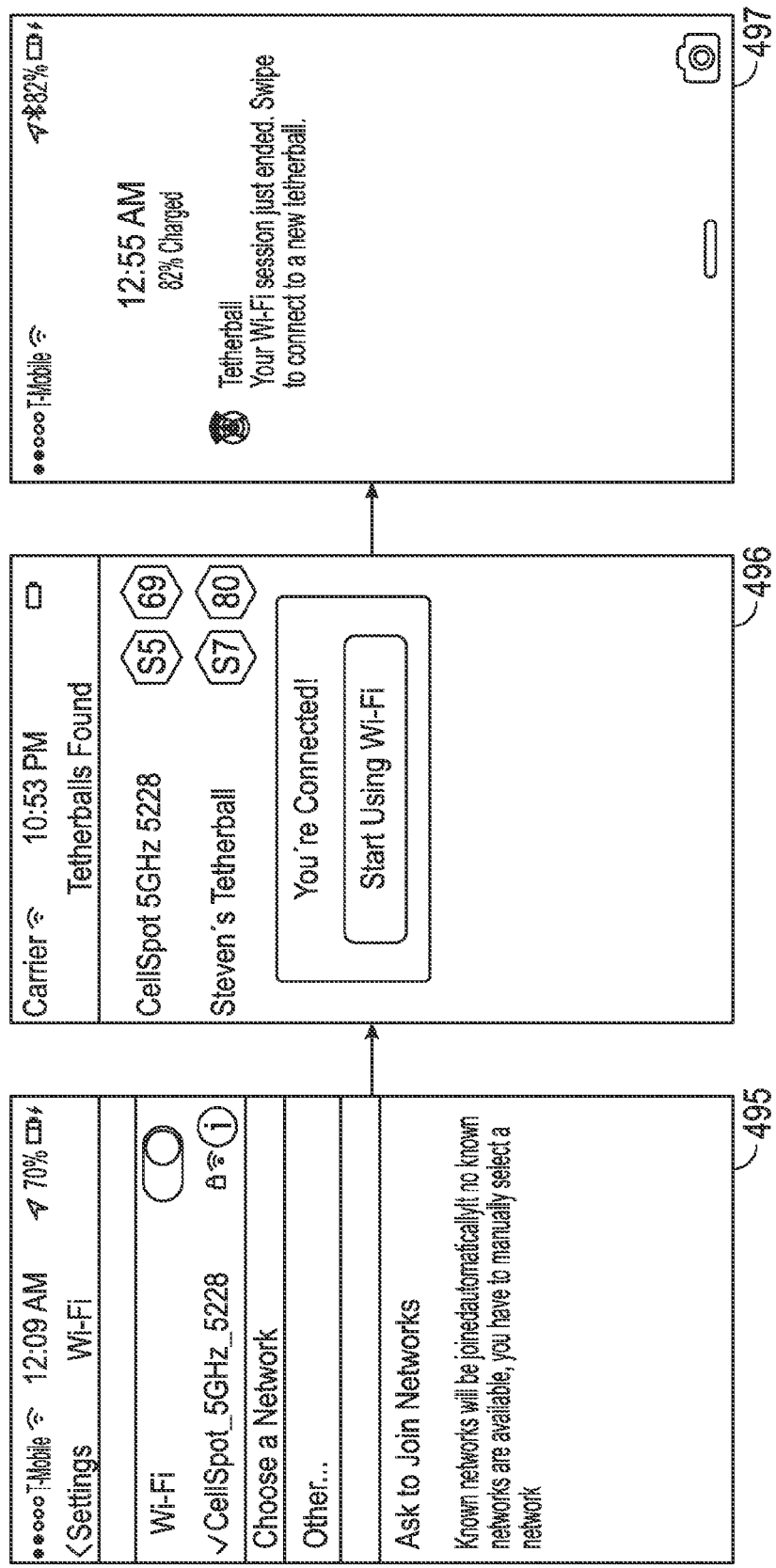

User authentication occurs with a simple username and password of the user's choosing as shown in FIG. 4A-4B, described herein. Upon login, the user is presented with two options—to provide Wi-Fi or get connected. If the user chooses the provide Wi-Fi option, the user's information, e.g., their Mac ID, or SSID and password of the created hotspot are uploaded to Parse associated with the user's account information. This forms a database of the users who are associated with the application, and their Mac IDs Each user has metadata associated with them such as their username, their object id, a timestamp of last updates, and any other misc. details such as their hotspot SSID and password. If the user chooses the get connected option, the programming of the present invention begins to scan for local Wi-Fi networks, and based on the SSID received from each Wi-Fi network, queries Parse for the user(s) associated with each SSID. Upon finding a match, the user interface of the app adds a new row to the list of the nearby "Tetherballs" found. The row contains information on signal strength, the carrier providing the data, and the name of the user (as well as a profile picture if using Facebook login). As mentioned before, such information can be retrieved from the User's metadata.

It is also contemplated, according to an alternative embodiment, to use one or more different backend data management and processing systems, that is, other than Parse. This would provide additional benefits as the process could be customized for the use and development of the bandwidth-sharing app.

Figure 5:
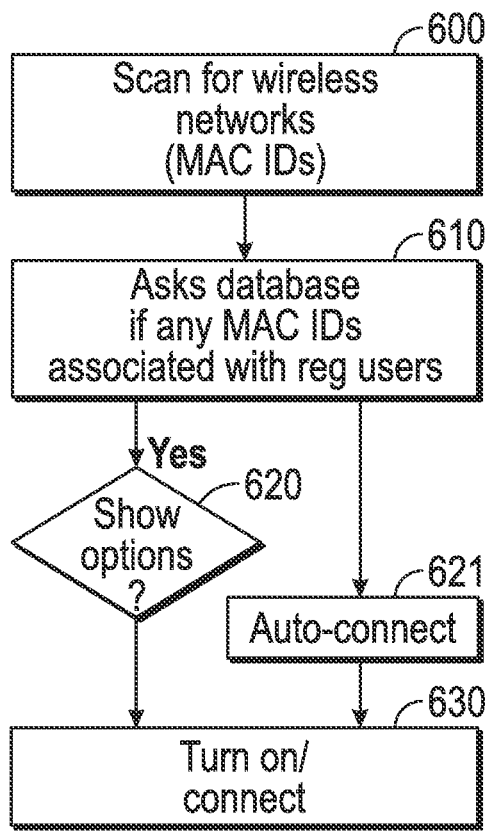
FIG. 5 shows a flowchart of operation of finding clients.

In operation, the app running on the user's device (either an owner or user device) can operate according to the flowchart of FIG. 5.

At 600, the app uses the radio equipment within the user's mobile device to scan for wireless networks. The radio equipment that is used may depend on the kind of wireless networks being scanned for. For example in one embodiment, the app is scanning for Wi-Fi networks, and may use the radio equipment of the Wi-Fi within the mobile device. The scanning looks for unique identifiers of all data sources within the local area. In one embodiment, those unique identifiers can be Mac IDs. At 610, the program asks the database, here Parse, if any of those Mac IDs are associated with registered users.

If any of those Mac IDs are associated with registered users, then all of different options of different connections are shown as options in 620. These options may be as described herein, for example the quality of the connection and the cost of connection. Alternatively, the different options may be automatically connected to, if parameters for auto connection has been set at 621.

The graphics are also automatically updated to show the other members, along with the quality of their data connection and other information about the users such as their mobile carrier.

At this point, the user's mobile device has information which enables the user or the app is appropriately programmed, to make an intelligent decision about where to obtain their data. The program has information about other data sources in their vicinity, and also has information about their own data source. If the program is set to automatically decide, it will decide whether to attach to other device's data source and the connection is in carried out at 630 by automatically setting a temporary password for the connection, and turning on the hotspot for the connection while starting to monitor the amount of data sent and received. The user may also manually select the source. As explained below, on iOS, a random password may be created from the application and copied to the user's password programmatically, requiring the user to paste that in.

For iOS, the operating system from Apple, the process is managed differently using the software summarized in FIG. 2. First, the host turns on their hotspot after being sent to settings at 200, using the code shown. Second, the host would select a name and password that would be distributed to other users with the app at 210. Third, the app then orchestrates the tracking of the host and users. For example, this can use Parse for that tracking. For Apple's iOS, the following steps are used for the user of bandwidth.

1. User clicks Get Connected
2. App uses the users' location and starts looking for hotspots nearby
3. User selects a hotspot of their choice, and pays for an amount of time
4. Session starts and password is copied to the users' clipboard
5. A timer starts indicating the amount of time the user has left
6. A screen is shown with the steps to join the hotspot with a button titled settings and instructions to return to the app once connected
7. The user routes to the Wi-Fi settings, chooses the specified host Wi-Fi name and pastes password to connect
8. User returns to the app, which confirms that the user has connected to the hotspot
9. In the case that the connection is lost, a user can go to the app and report a loss of connection, which pro-rates the cost to length of the connections
10. The user receives a push notification at the end of their session with the option to buy more time For Apple's iOS, the following steps are used for the provider (host) of bandwidth and as explained herein.

1. Host clicks provide Wi-Fi
2. App records the hosts hotspot name and creates a password which is copied to the host's clipboard programmatically
3. A screen is shown with the steps to turn on the hotspot with a button that says start
4. Host clicks start and is taken into settings in which the host navigates to hotspot settings
5. Host turns on hotspot and sets password by pasting the password that has been put into the clipboard, into the text field
6. Host returns to the app and clicks "hotspot ready"
7. Once a user connects to the host, the host receives a push notification that a user has connected 8. At the end of the paid time by the user, the host receives a push notification to change password and process starts again from step 2 The following code can be used in one embodiment to create a Tetherball Host Hotspot

```
-(void)createHostHotspot{
    PFObject *newHotspot = [PFObject
objectWithClassName:@"tetherballHotspots"];
    newHotspot[@"host"] = [PFUser currentUser];
    newHotspot[@"password"] = [self generatePassword];
    newHotspot[@"location"] = geopoint;
    newHotspot[@"hotspotName"] = [self hotspotName];
    [newHotspot saveInBackground];
    UIPasteboard *pb = [UIPasteboard generalPasteboard];
    [pb setString:newHotspot[@"password"]];
}
-(NSString *)generatePassword{
    NSString *letters =
@"abcdefghijklmnopqrstuvwxyzABCDEFGHIJKLMNOPQRSTUVWX
YZ0123456789";
    NSMutableString *randomString = [NSMutableString
stringWithCapacity:10];
    for (int i = 0; i < 10; i++) {
        [randomString appendFormat:@"%C", [letters
characterAtIndex:arc4random( ) % [letters length]]];
    }
    return randomString;
}
-(NSString *)hotspotName{
    return [[UIDevice currentDevice]name];
}
Find Nearby Tetherballs
-(void)getLocalHotspots{
    PFQuery *query = [PFQuery
queryWithClassName:@"tetherballHotspots"];
    [query whereKey:@"location" nearGeoPoint:geopoint
withinKilometers:.05];
    [query findObjectsInBackgroundWithBlock:^(NSArray *objects,
NSError *error) {
        if (objects) {
            [self loadHotspotsToTable:objects];
        }
    }];
}
Get Password from Selected Hotspot Saved to Clipboard
-(void)selectedTetherballHotspot:(PFObject *)tetherballHotspot{
    NSString *password = tetherballHotspot[@"password"];
    UIPasteboard *pb = [UIPasteboard generalPasteboard];
    [pb setString:password];
    [self
showCustomAlertWithTitle:tetherballHotspot[@"hotspotName"]
andText:@"•click open settings \n•select Wi-Fi \n•select
"CellSpot__5GHz__5228" \n•paste password from clipboard \n•return to
tetherball"];
}
Send to Settings Code
- (void)openSettings
{
    NSURL *url = [NSURL
URLWithString:UIApplicationOpenSettingsURLString];
    [[UIApplication sharedApplication] openURL:url];
}
Tracking Code - IOS
-(void)trackUserSessionStart:(NSString *)sessionID{
    NSDate *currentTime = [NSDate date];
    PFObject *userTetherballSession = [PFObject
objectWithClassName:@"UserTetherballSession"];
    userTetherballSession[@"startTime"] = currentTime;
    userTetherballSession[@"user"] = [PFUser currentUser];
    userTetherballSession[@"sessionID"] = sessionID;
    [userTetherballSession saveInBackground];
}
-(void)trackUserSessionEnded:(NSString *)sessionID{
    NSDate *currentTime = [NSDate date];
    PFQuery *query = [PFQuery
queryWithClassName:@"UserTetherballSession"];
    [query whereKey:@"sessionID" equalTo:sessionID];
    [query findObjectsInBackgroundWithBlock:^(NSArray *objects,
NSError *error) {
        if (objects) {
            PFObject *userTetherballSession = objects[0];
            userTetherballSession[@"finishTime"] = currentTime;
            [userTetherballSession saveInBackground];
        }
    }];
}
-(void)trackHostSessionStart:(NSString *)sessionID{
    NSDate *currentTime = [NSDate date];
    PFObject *userTetherballSession = [PFObject
objectWithClassName:@"HostTetherballSession"];
    userTetherballSession[@"startTime"] = currentTime;
    userTetherballSession[@"user"] = [PFUser currentUser];
    userTetherballSession[@"sessionID"] = sessionID;
    [userTetherballSession saveInBackground];
}
-(void)trackHostSessionEnded:(NSString *)sessionID{
    NSDate *currentTime = [NSDate date];
    PFQuery *query = [PFQuery
queryWithClassName:@"HostTetherballSession"];
    [query whereKey:@"sessionID" equalTo:sessionID];
    [query findObjectsInBackgroundWithBlock:^(NSArray *objects,
NSError *error) {
        if (objects) {
            PFObject *userTetherballSession = objects[0];
            userTetherballSession[@"finishTime"] = currentTime;
            [userTetherballSession saveInBackground];
        }
    }];
}
```

FIG. 4A shows a set of screen shots for the flow of the application, for the host side of the application. This starts with a login at 400, where the user enters their username and password. After entering the username and password at 405, the user is provided with a screen that determines whether they want to share their Wi-Fi at 406 or get connected at 407. This is the host side, so the user clicks share, which causes the instruction screen at 410, which provides the user instructions on how to operate, here to open settings, turn on their hotspot, and use the system-generated password (which will also be provided to the user who shares) At 415, the user opens, in the iOS application, their settings followed at 420 by turning on their personal hotspot. Since they are connecting, the password for that hotspot has been placed into their clipboard, which at 425 is shown as the paste command 426. This places the password 431 into the password field as shown in screen 430. After doing that, the hotspot is shown as ready at 435. At the same time, the screens at 440 and 445 shows that the user just connected and respectively was finished.

The user side of the operation is shown in FIG. 4B, where at 450 the user logs in, followed by selecting from the screen 455 to get connected at 456. This brings up the screen 460 which shows the system searching for users within range, and at 465 shows which Tetherballs have been found. The user selects one from this list, here the cell spot 466. Once selecting that cell spot, instructions on how to operate are provided in screen 470 as item 471. This indicates that the user should open their settings, select their Wi-Fi, select the cell spot hotspot, paste the password from the clipboard (same password provided to the host) and then return. 475 illustrates the user opening the settings, and 480 shows the nearby Wi-Fis. The user selects the Wi-Fi 481, and in 485 the user pastes at 486 the password. This is shown entered at 490, followed by the user being connected at 495. This brings up the start using Wi-Fi screen 496 and brings up the status screen 497.

Once the app has done its work in the background, the advantages for the user are significant. This entire wireless infrastructure can be optimized in real-time to provide the best signals and communication abilities for a user. Given the availability of the major wireless service providers, private networks and public networks, the speed and quality of data transmission is greatly enhanced for the user. On a macro-scale, the entire system benefits as a "smart-grid" is effectively created to allocate resources in the most efficient and effective manner possible. This occurs without an investment beyond the downloading of the mobile app. The embodiments also have environmental benefits as it helps ensure a resource that is paid for (bandwidth) is not wasted.

The disclosed system also gives the user the opportunity to monetize their connection and bandwidth. The user can choose to allow friends, family and even strangers to utilize his or her Internet connection with a fee to these people based on time or the amount of data transmitted. In this regard, it is conceptually similar to Airbnb or Uber, but it relates to sharing of wireless computer resources, rather than rooms or rides.

According to embodiments, the user can set the amount of monetization that they desire to be either constant or, to be based on parameters and situations. For example, a user may set the amount that they desire for use of their data as a function of how much data they have already used in the month. In one embodiment if the user is at day 20 of their 30 day billing cycle, and they have only used a very small portion of their data, they can make their data available to others for a smaller fee in an attempt to use the last of their data. Conversely, if the user is close to the edge of their data plan, they can set the price higher, to take into account the possibility of overage fees by their carrier.

In another embodiment, the user can decide based on some kind of special occasion or special event that they want to increase or decrease the amount that others will pay to share their data. For example, at a concert or other gathering, the user can set their data to be more expensive because there will be so much demand for the data.

In another embodiment, the user can set automatic criteria for use of data as the demand for the data increases. For example, the user can automatically increase their data cost to others by 25% each time there are 5 queries about using their data.

The income taken from the data is automatically split between the Tetherball service and the data owner, with the Tetherball service receiving, out of each $X hour charged to User, a Revenue Share wherein the owner/host gets % Y, Tetherball gets % Z.

It is also envisioned that within the preferences of the app's programming, the host could set guidelines based on various pricing and time metrics. For example, when demand reached a critical level, the host's phone can automatically begin selling data or bandwidth access given the favorable economics. Alternatively, if a host was reaching the end of their data plan for that month, they could reduce the implementation of the hotspot automatically. It would effectively emulate a real-time marketplace where rational decisions are based on the prices provided by supply and demand at the moment.

The disclosed system allows for strangers to use the resources of another private, non-commercial party, in exchange for compensation conducted via software. The programming of the app allows for integration with established payment processors such as PayPal or Google Wallet. The accounting and security associated with financial data from credit cards and banks is kept within their methods and systems. For Android devices, the use of Google Wallet is likely preferred due its family resemblance from Google. It is anticipated that the embodiments may include additional programming to best effectuate these linkages.

The user interface of the present invention provides an index score for the host's connection. The index score can be a score that grades out of a total of 100. It is a calculation of the host's tethering abilities relating to at least four variables: distance of the resource, price, speed, and signal strength. The following equation demonstrates it: "N" being the index score out of 100, "D" being the total distance in feet, "P" being the price per hour, "S" being the total speed of the host's connection in Mbps, and "B" being the Wi-Fi signal bars demonstrated to the user based on signal strength. Distance is calculated with a weight of 25 based on the total distance of a 2.4 Ghz band reaching 150 feet it is measured by the total distance, in feet, multiplied by 0.166. The price is calculated with a weight of 9 being the highest amount able to be charged then subtracted by the cost being charged. The speed is calculated with a weight of 56, 56 being the fastest speed of a mobile, LTE, connection, it is measured by a score of one per Mbps (Megabits per second). The signal strength is calculated with a weight of 10 being two multiplied by the number of Wi-Fi signal bars which is measured by the dBm of −50 being the highest, 5 bars, and −100 being the lowest, 0 bars. These criteria and calculations may be modified based on real world usage and customer feedback.

The present invention's rating system also allows clients to view information about other users impressions of the specific host's connection. This allows the users to obtain some insight for the users on the best connection to tether from out of all of the possibilities. Our rating system allows users to rate the host out of 5 stars after using their service(s), this is left as feedback able to be viewed prior to another person using that same host connection. This rating system can be a star rating system where users give stars depending on how their experience went. It can also be based on computer ratings that are calculated by the different apps in the different clients or in the backend. For example, this can be based on multiple computer-calculated variables including:

The historical quality of their Tetherball, that is, the other times that the client was used as a tether, how did it match up in the real world. Did it meet up to its advertised data transfer rate. Were there any other problems?

Other variables include utilization of their bandwidth, historical pricing patterns, responsiveness to user feedback, tenure with the service, peer rating and other factors. Other rating systems may also be employed without departing from the spirit of this invention.

Data sharing can be done via Bluetooth as well with the present invention. Using Bluetooth, multiple devices can provide chunks of data whereas on Wi-Fi, only one device can provide the data directly to the phone. This limitation exists since the Wi-Fi chipset on a mobile device 1) Cannot connect to a Wi-Fi network while it is being used to broadcast its wireless signal as a hotspot 2) and also cannot connect to multiple Wi-Fi networks at a time. A Bluetooth connection occurs when two devices pair with each other. Upon pairing, the two devices can send data to each other and vice versa. A bluetooth enabled device can also connect to multiple bluetooth connections. Suppose a user wants to download a file or load a webpage. The user can connect to as many bluetooth Tetherballs as desired and stream parts of that file or website from those devices. The other added advantage of bluetooth is that not only can data from the cellular connection be shared via bluetooth, but also data from a Wi-Fi connection.

In one embodiment, the data that comes from Bluetooth may not be piped into the Ethernet layer of the device, and therefore the data received via Bluetooth would only work in the app receiving it.

In this case the app can be ported into another app. For example, the Tetherball app being ported into the Facebook app would allow data received via Bluetooth to only be utilized within the Facebook app only and not the Ethernet layer.

Another embodiment and/or extension of this software includes a hardware device much like hotspots offered by carriers today. Instead of using a smartphone, the present software runs on its own piece of hardware, e.g., a "dongle". This dongle can be a single purpose device without any of the overhead necessary in many of the different portable devices as it does not require any kind of touchscreen, sensors, GPS, or other power consuming and expensive accessories that a smartphone might have (thus reducing costs and extending overall battery life). It could be a simple palm sized device with cellular network connectivity equipped with a Wi-Fi module strapped on to a motherboard running Android, and (optional) a screen of some sort to display relevant information about the data usage. Such a hardware device could be placed on buses, taxis, and stationary places within parks or outdoor locations where masses of people would benefit from the Wi-Fi connection.

Furthermore, in a scenario requiring widespread Wi-Fi access (more than 100 ft radius such as at a park), several of these devices could be spread out equidistant of each other, and users could hop from one to the other as they move about the space. A backend server manages and syncs the client's information across each of the hardware devices, providing an efficient way to cover large areas while maintaining the monetization of Wi-Fi access.

Another embodiment includes the modification of a device that has multiple Wi-Fi modules or a single module with capacity for multiple Wi-Fi signals. This would allow for much improved connectivity. It is analogous to a dual-clutch transmission in an automobile. Instead of switching from one network or Wi-Fi connection to another in a slow or jerky fashion, this embodiment could always be connected to two signals, e.g. the two "best" signals, or the "best" signal, and also the signal that the computer recognizes as showing the most likelihood of increasing data over time. In this way, optimal connectivity would be more likely. Similar to shifts in an automobile with a dual-clutch transmission, the transitions would be smoother, faster, and more seamless than the current methods. The present invention also contemplates the creation of a device that either (1) extends Wi-Fi range or (2) adds on multiple Wi-Fi antennas to a smartphone. In case of the first scenario, the device would plug into the USB port of an Android device and include within it a Wi-Fi antenna and chipset for repeating Wi-Fi signals and a battery to both charge the phone and provide power to the Wi-Fi chipset. In the case of the second scenario, the device would be manufactured with the additional chipset built in. It is also contemplated that other user devices such as music player or smart watches could be utilized for their Bluetooth or Wi-Fi capabilities since the majority of these devices have both of these chipsets. The mobile device, such as a smartphone, could become the master and make the watch or other device a slave. In this way, data could be accessed through multiple antennas.

The present invention can also be utilized by commercial partners according to another embodiment. In one embodiment, a company such as Facebook could give its users a connection or quantity of data in exchange for advertising, sponsorship, or other benefits. The sponsor company could utilize its own wireless signals or develop partnerships with the wireless carriers to provide this access. This would be effective in certain markets and at specific times. Imagine getting to an outdoor festival with limited wireless access and being able to connect to a signal sponsored by a beverage company. The company would get a lot of "eyeballs" on their products while providing a benefit to the users, all in the context of an easy-to-use app as described here.

The present invention can also be vertically integrated within an existing social networking company or other industry leader. Companies such as Facebook are almost entirely dependent on their users for content submission, maintenance, updates, viewing and downloading. This requires connectivity on both sides of the network (upload and download). Consequently, limited Internet access causes the entire business of these companies to suffer. Having enhanced connections through the offering of Tetherball increases customer satisfaction while supporting the importance of community or "family" that these companies try to build. Therefore the vertical integration of a social network, along with its members and businesses promoted within the network, may align with the offering of enhanced connectivity. With more data being transmitted and more users, the value proposition is greatly enhanced.

Another aspect of the present invention is the ability to promote Internet access and connectivity in less developed nations. Without the infrastructure of more developed economies, residents in these places do not have the access they need for education, health and business. Companies such as Google and Facebook have experimented with various technologies including balloons and drones. The current invention allows wireless Internet access to expand in these places with far less infrastructure investment. It provides a low-cost mesh or peer-to-peer network where the use of bandwidth is shared and maximized in a smart and economical way.

This invention also anticipates the power of effective peer-to-peer data sharing. With the recent news headlines over government surveillance and the record keeping of large companies, many people are concerned for the safety and privacy of their data. With peer-to-peer, it is possible for users to share data without sending it through the "cloud." This process would be similar to Apple's Airdrop but on a larger scale and without the distance limitations. It's an "under the cloud" solution that would increase privacy, enhance flexibility and reduce network congestion. It's about sharing data when and where it's required without excess travel and transmission.

While the preferred embodiments have been shown and described, it will be understood that there is no intent to limit the invention by such disclosure, but rather, is intended to cover all modifications and alternate constructions falling within the spirit and scope of the invention.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, other operating systems could be used, other code in the same operating system, or the like.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard-wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations, using tangible computer programming. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

APPENDIX

Computer Code

```
Relevant Android code:
public void startHotspot( ) {
  new Thread(new Runnable( ) {
    @Override
    public void run( ) {
      if (TetherballApplication.getInstance( ).status !=
TetherballStatus.PROVIDING) {
        //Set up the hotspot
        setHotspotState(false);
        pass = new RandomPasswordGenerator( ).generatePswd(8, 8, 3, 2, 0);
        ssid = ParseUser.getCurrentUser( ).getUsername( ) + "'s Tetherball";
        setHotspotCredentials(ssid, pass);
        setHotspotState(true);
        TelephonyManager manager = (TelephonyManager)
getSystemService(Context.TELEPHONY_SERVICE);
        String carrierName = manager.getNetworkOperatorName( );
        ParseUser user = ParseUser.getCurrentUser( );
        user.put("ssid", ssid);
        user.put("wifipass", pass);
        user.put("carrierName", carrierName);
        user.saveInBackground( );
      }
      if (tetherActivity != null) {
        tetherActivity.runOnUiThread(new Runnable( ) {
          @Override
          public void run( ) {
            tetherActivity.setProgressBarIndeterminate(false);
            tetherActivity.setProgressBarIndeterminateVisibility(false);
            status = TetherballStatus.PROVIDING;
          }
        });
      }
    }
  }).start( );
}
public void stopHotspot( ) {
  setHotspotState(false);
  status = TetherballStatus.NOTHING;
}
private void setHotspotState(boolean state) {
  WifiManager wifi_manager = (WifiManager)
```

APPENDIX-continued

Computer Code

```
this.getSystemService(WIFI_SERVICE);
  WifiConfiguration wifi_configuration = null;
  wifi_manager.setWifiEnabled(false);
  try {
    //USE REFLECTION TO GET METHOD "SetWifiAPEnabled"
    Method method =
wifi_manager.getClass( ).getMethod("setWifiApEnabled",
WifiConfiguration.class, boolean.class);
    method.invoke(wifi_manager, wifi_configuration, state);
  } catch (NoSuchMethodException | IllegalArgumentException |
IllegalAccessException | InvocationTargetException e) {
    e.printStackTrace( );
  }
}
private void setHotspotCredentials(String SSID, String password) {
  WifiManager wifiManager = (WifiManager)
this.getSystemService(WIFI_SERVICE);
  if (wifiManager.isWifiEnabled( )) {
    wifiManager.setWifiEnabled(false);
  }
  WifiConfiguration netConfig = new WifiConfiguration( );
  netConfig.SSID = SSID;
  netConfig.preSharedKey = password;
netConfig.allowedAuthAlgorithms.set(WifiConfiguration.AuthAlgorithm.LEAP);
  netConfig.allowedProtocols.set(WifiConfiguration.Protocol.RSN);
  netConfig.allowedProtocols.set(WifiConfiguration.Protocol.WPA);
netConfig.allowedKeyManagement.set(WifiConfiguration.KeyMgmt.WPA_PSK);
  try {
    Method setWifiApMethod =
wifiManager.getClass( ).getMethod("setWifiApEnabled",
WifiConfiguration.class, boolean.class);
    boolean success = (Boolean) setWifiApMethod.
invoke(wifiManager, netConfig, true);
    Log.d("setWifiApEnabled", "" + success);
    Method isWifiApEnabledmethod =
wifiManager.getClass( ).getMethod("isWifiApEnabled");
    while (!(Boolean) isWifiApEnabledmethod.invoke(wifiManager)) {
    }
    Method getWifiApStateMethod =
wifiManager.getClass( ).getMethod("getWifiApState");
    getWifiApStateMethod.invoke(wifiManager);
    Method getWifiApConfigurationMethod =
wifiManager.getClass( ).getMethod("getWifiApConfiguration");
    netConfig = (WifiConfiguration)
getWifiApConfigurationMethod.invoke(wifiManager);
    Log.i("CLIENT", "\nSSID:" + netConfig.SSID + "\nPassword:" +
netConfig.preSharedKey + "\n");
  } catch (Exception e) {
    e.printStackTrace( );
  }
}
public boolean isHotspotEnabled( ) {
  try {
    WifiManager wifiManager = (WifiManager)
this.getSystemService(WIFI_SERVICE);
    Method isWifiApEnabledmethod =
wifiManager.getClass( ).getMethod("isWifiApEnabled");
    return (Boolean) isWifiApEnabledmethod.invoke(wifiManager);
  } catch (Exception e) {
    return false;
  }
}
```

What is claimed is:

1. A mobile device comprising:
   a computer running a controlling program for operating functions of the mobile device;
   said computer operating, based on said controlling program, for detecting plural different data sources in an area of the mobile device, and said computer detecting unique identifiers for each of the plural different data sources that are detected;
   said computer checking a database which has a correlation between a plurality of said unique identifiers, and a plurality of clients who are registered to be data sharing clients to provide data to others; and said computer allowing selection of one of multiple clients who are determined by the computer to be registered to be data sharing clients, said computer receiving a selection of one of said multiple clients as a selected client;

said computer using data that is sourced from the selected client by receiving data from the selected client and using the data received; and said computer keeping track of an amount of data used by the mobile device, wherein said allowing selection comprises actions which turn on a hotspot on the one client, where the hotspot was off prior to said actions, and to pass information indicative of a password of the hotspot to the mobile device.

2. The device as in claim 1, wherein said actions comprises a message to the one client to turn on its hotspot, and receiving information indicative of the password.

3. The device as in claim 2, wherein said information indicative of the password causes the password to be copied to a clipboard of the mobile device, and instructions provided to a user of the mobile device to paste the information from the clipboard.

4. A method of operating a mobile device comprising:

using a computer for running a controlling program for operating functions of the mobile device;

using said computer for detecting plural different data sources in an area of the mobile device, and detecting unique identifiers for each of the plural different data sources that are detected;

using said computer for checking a database which has a correlation between a plurality of unique identifiers, and a plurality of clients who have registered with the database to be data sharing clients;

using said computer for allowing selection of one of multiple clients who are determined by the computer to be registered to be data sharing clients, receiving a selection of one of said multiple clients as a selected client in the computer, using data that is sourced from the selected client in the computer; and using said computer to indicate at least one cost of said receive of data, wherein said allowing selection comprises actions which turn on a hotspot on the one client , where the hotspot was off prior to said actions, and pass information indicative of a password of the hotspot to the mobile device.

5. The method as in claim 4, wherein said actions comprises a message to the one client to turn on its hotspot, and receiving information indicative of the password.

6. The method as in claim 5, wherein said information indicative of the password causes the password to be copied to a clipboard of the mobile device, and instructions provided to a user of the mobile device to paste the information from the clipboard.

\* \* \* \* \*